United States Patent [19]

Druzhinin et al.

[11] Patent Number: 4,918,456
[45] Date of Patent: Apr. 17, 1990

[54] APPARATUS FOR DETECTING HETEROGENEITY OF WATER SURFACE

[75] Inventors: Nikolai V. Druzhinin; Anatoly R. Pavlenko; Valentin G. Abakumov; Adnan D. Al-Kadimi; Sergei V. Zhluktenko; Vladimir S. Lazebny, all of Kiev; Anatoly I. Kalmykov, Kharkov; Elena G. Kuzoyatova, Donetsk; Viktor Y. Chuev; Anatoly S. Sysoev, both of Novorossiisk; Alexandr P. Pichugin; Anatoly B. Fetisov, both of Kharkov; Stanislav V. Denbnovetsky; Alexandr V. Leschishin, both of Kiev; Vladimir P. Kuzmin; Vladimir N. Mikhailov, both of Novgorod, all of U.S.S.R.

[73] Assignee: Kievsky Politekhnichesky Institut, Kiev, U.S.S.R.

[21] Appl. No.: 152,343

[22] Filed: Feb. 4, 1988

[51] Int. Cl.$^4$ ............................................. G01S 13/95
[52] U.S. Cl. ...................................... 342/26; 342/176
[58] Field of Search ................ 342/22, 26, 197, 176, 342/175

[56] References Cited

U.S. PATENT DOCUMENTS

| | | | |
|---|---|---|---|
| 3,009,144 | 11/1961 | Landee | 342/176 X |
| 3,893,110 | 7/1975 | Drake | 342/176 |
| 4,092,644 | 5/1978 | Hodge | 342/26 |
| 4,101,891 | 7/1978 | Jain et al. | 342/26 X |
| 4,509,048 | 4/1985 | Jain | 342/26 X |

OTHER PUBLICATIONS

"Remote Detection of Oil Slicks With IR Laser", by V. Bogorodsky et al., L. Gidrometizdat, 1975, pp. 28–31.
"Meteorological Radar Stations of Civial Aviation US Aircraft", Radioelektronika za rubezhom, No. 14(856) 1978, pp. 14–16.
Journal of the Institute of Television Engineers of Japan, vol. 29, No. 10, 1975, pp. 813–814.
"On Automation Change of Modes of a Cathode Ray Storage Tube", by N. V. Druzhinin, Vestnik Kievskogo politekhnicheskogo instituta, No. 16, 1979, pp. 98–100.
Thomson-CSF Groupement Electroniques, Data Tev 3140, Jan. 1973, pp. 19–20.
"Les Tubes a Memoire Enregistreurs (TME)", by B. Courian et al., in Revue Technique Thomson-CSF, vol. 3, No. 4, Dec. 1977, pp. 695–725.
"Scientific Equipment of US Satellite SEASAT-1", by M. V. Bukharov, Zarubezhnaya radioelektronika (in Russian), No. 8, pp. 33–40.

Primary Examiner—Thomas H. Tarcza
Assistant Examiner—Mark Hellner
Attorney, Agent, or Firm—Fleit, Jacobson, Cohn, Price, Holman & Stern

[57] ABSTRACT

An apparatus for detecting heterogeneity of water surface has a series circuit including a transceiver, a hydrometeorological information processing and storage unit and an indicator. According to the invention, the hydrometeorological information processing and storage unit has a cathode ray storage device with a mode selector unit and an electron beam control system as well as a driving generator and a control unit.

9 Claims, 10 Drawing Sheets

APPARATUS FOR DETECTING HETEROGENEITY OF WATER SURFACE

FIELD OF THE ART

The invention relates to the radio engineering and, more specifically, to radar technology, in particular, to apparatuses for detecting heterogeneity of water surface.

The invention may be used for detecting anomalies on the surface of large water reservoirs and, in the most efficient manner, it may be employed in the zone of coastal and sea oil field, oil loading and other ports and also in coastal holiday resort zones for prompt detection of spillages of oil products and other pollutants for the protection of the environment.

BACKGROUND OF THE INVENTION

Productive activity of society has brough a new dimension to the problems of the environment protection.

Accidental spillages of oil products, formation of slicks of surfactants on the water surface result in mass killing of fish, aquatic animals and plankton, pollution of coastal industrial zones and holiday resort areas. Undetected and non-eliminated oil and other slicks form water emulsions settling down to the water reservoir bottom and killing bottom plants. The harmful effect on the environment may be reduced by prompt detection and destruction of such slicks at any time day and night and under various weather conditions.

Contact methods were first used to detect water surface pollution such as sampling and subsequent analysis or a method of a floating capacitor based on measurement of capacitance between the layer of oil and water for oil slicks 0.5 to 6 cm thick, and the like. However, apparatuses employed for these purposes exhibit a very high sensitivity to high seas and feature a low response speed.

Later on remote (non-contact) methods came into use for detecting heterogeneity of water surface. A microwave radiometer was used as detector (cf. Bukharov M. V. Scientific Equipment of US Satellite SEASAT-1. Zarubezhnaya radioelectronika (in Russian), No. 8, 33-40). The radiometer is in the form of an aerial with a scanning means and a radiometric channel unit. Each radiometric channel comprises a series circuit including a switching member, a balanced mixer with an intermediate frequency amplifier, a square-law detector, a synchronous detector and a d-c amplifier. An output of the aerial system or reference or calibration radiation sources may be connected to one of the mixer inputs via the switching member. A heterodyne is connected to the other input of the mixer. Under working conditions, a signal to be measured is fed, via the switching member, to the mixer input where it is mixed with the heterodyne signal, the resultant signal being amplified. After the square-low and synchronous detection, an analog signal of the radiometric channel is formed at the output of the d-c amplifier. This signal carries information on temperature of the water surface. Temperature differences occur at heterogeneities of the water surface. Thus, in areas of pollution with oil products an increase in radio brightness temperatures occurs which makes it possible to ensure a rapid detection of such areas.

This apparatus cannot, however, be used for the detection of thin slicks of surfactants less than 100 $\mu$m thick, and the detection results will materially depend on seas.

A new step in this direction was to use examination of infrared reflection spectra with the aid of lasers (cf. V. V. Bogorodsky, M. A. Kronotkin. Remote Detection of Oil Slicks with IR Laser. (in Russian). L., Gidrometizdat, 1975).

The apparatus comprises the following devices rigidly connected to one another: a laser having a mechanical chopper, a rotating plane mirror and a receiving and recording unit consisting of an optical focusing system, a bolometric receiver and a recorder. Laser radiation modulated at a pre-set frequency by means of the plane mirror is incident upon the water surface. The radiation reflected from the surface is directed to the radiation receiver by means of the optical focusing system. The signal from the bolometric radiation receiver is recorded by means of a voltmeter having a pointer or digital indicator at the output.

This apparatus is, however, strongly dependent on meteorological conditions where it is not possible to carry out mapping of a heterogeneity on the sea surface.

A further development in the class of these apparatuses is meteorological radar stations. Basic modes of operation of such radar stations are normal and contour scanning of meteorological formations, "image freezing" and radar mapping of the Earth surface. When working in the latter mode, various peculiar features of the Earth surface as well as oil slicks on the sea surface may be viewed on the indicator screen.

Such apparatus generally have an indicator built around a high-voltage TV-type cathode ray tube having intermediate characteristics in comparison with indicators built around normal and storage-type cathode ray tubes. An adequate brightness in such an indicator may be obtained by means of a raster scanning, and it is not absolutely necessary to make use of a luminphor with a long afterglow. During indication of radiolocation data, intermediate data (video signals) are stored during the period of direction scan.

It is preferred nowadays to use digital data storage since a memory with a maximum storage capacity of $10^5$ to $10^6$ bits is necessary for indication in meteorological radar stations. The use of such memory in indicators of meteorological radar stations is considered quite practical and warranted.

Known in the art is an apparatus for detecting heterogeneity of water surface (cf. Rev. "Meteorological Radar Stations of Civial Aviation US Aircraft" in Radiooelektronika za rubezhom (in Russian). No. 14(856) 1978, pp. 14-16), comprising a transeiver, a data processor and an indicator built around a cathode ray tube which are connected in series with one another. The data processor consists of a driving generator having an output connected to an input of a control unit. The output of the control unit is connected to an input of a digital erasable memory, to an input of an integrating circuit and to an input of a sweep generator. The input of the integrating circuit is also a video signal input connected to the transceiver, and its output is connected to an input of an adder and comparator. The second input of the adder and comparator is coupled to an output of the memory, and an output of the adder and comparator is connected to a second input of the memory. An output of the memory is connected, via the sweep generator, to a beam sweep system and to an electrode controlling brightness of glow of the cathode ray tube in the indicator.

Video signals are fed in the digital form from the receiver output to the integrating circuit, they are integrated during several cycles and are then fed to the memory, via the adder and comparator. The memory is in the form of a shift register working in the erase and write mode. When new data arrive from the integrating circuit, they are compared in the adder and comparator with the data stored in respective cells of the memory. If these data are materially different, the new data will replace the data that have been stored in the memory.

As the aerial carries out direction scan, each of the pixels into which the screen is divided will either remain dark or glow with green colour at one of brightness values depending on intensity of precipitates that are "observed" by the aerial at a given moment. The control of the beam position is ensured by the memory which stores one bit for each pixel on the screen. The information stored in the memory is displayed on the screen at a frequency which is sufficient to avoid a strong flicker of image on the screen.

However, such apparatuses exhibit high quantizing noise during digital processing of a signal, and a limited memory capacity does not make it possible to accumulate an optimum number of direction scan cycles for the best detection of heterogeneity of water surface. Time-dependent automatic gain control systems available in such stations suppress the screen illumination by a signal diffused by a fine seas ripple, i.e. by a signal that carries basic information on heterogeneities at medium and short ranges. These radar stations are expensive and are made for aviation applications so that implementation of such tasks as oil slick detection is very expensive.

SUMMARY OF THE INVENTION

It is an object of the invention to ensure prompt detection of various heterogeneities of water surface with a high probability owing to an increase in the signal-to-noise ratio by decorrelation of the noise signal with subsequent integration of the reflected radar signal during direction scan cycles.

This and other objects are accomplished by that in an apparatus for detecting heterogeneity of water surface, comprising a series circuit including a transceiver, a hydrometorological data processing and storage unit, and an indicator, according to the invention, the hydrometeorological processing and storage unit comprises a cathode ray storage device having a mode selector unit and a beam control system having a series circuit including a focusing and deflection system, a sweep voltage converter and a sweep voltage former, a video signal amplifier having an input connected, via an amplitude selector, to an output of the transceiver and an output connected, via a video signal switching member, to a data output of the main cathode ray storage tube and, via a readout signal switching member, to the indicator; a driving generator connected to the sweep voltage former and to the transceiver, and a control unit connected to the driving generator, video signal switching member, redout signal switching member and mode selector unit of the cathode ray storage device, the indicator being built around a cathode ray tube capable of displaying a half-tone image with a large-range brightness scale.

This apparatus ensures prompt detection of various heterogeneities of water surface with a high degree of probability owing to a higher signal-to-noise ratio by storing data during several direction scan cycles.

The hydrometeorological information processing and storage unit preferably comprises a decorrelation unit in the form of a programmed pulse frequency divider having an input connected to an output of said driving generator and an output connected to an input of the mode selector unit of the main cathode ray storage device.

The hydrometeorological information processing and storage unit may be provided with a switching member for the cathode potential of the cathode ray storage device having one input connected to an output of the decorrelation unit, another input connected to an output of the control unit and an output connected to an input of the cathode ray storage device.

The information processing and storage unit may also comprise an analog switch having a control input thereof connected to the output of the decorrelation unit, a signal input connected to an output of the amplitude selector and an output connected to a signal input of the video signal amplifier.

Decorrelation of video signals in neighbouring stored scans ensures a material improvement of information display against the background of a fine-structured seas noise.

The beam control system may also comprise a pulse counter having a count input connected to an output of the driving generator and to an input of the control unit and a reset input connected to an output of the transceiver, a digital-to-anolog converter having its digit inputs connected to digit outputs of the counter and an output connected to one of the inputs of the sweep voltage converter of the cathode ray device, the other input being connected, via an attenuator, to the output of the sweep voltage former, and a threshold member inserted between the main readout signal switching member and a signal input of the indicator.

This ensures the display of information with the suppression of the background caused by various noises including those induced by structure noise caused by water ripples.

The apparatus for detecting heterogeneity of water surface may be provided with an auxiliary cathode ray storage device having its own mode selector unit with a variable reference voltage source connected thereto, an auxiliary focusing and deflection system having an input connected to an input of the focusing and deflection system and to an output of the sweep signal converter, an auxiliary control unit having an input connected to a first input of the main control unit and to an output of the aerial unit of the transceiver and a second input which is tied together with a second input of the main control unit and output of the driving generator, a third input connected to an output of the main control unit, an output of said auxiliary control unit being connected to the auxiliary mode selector unit of the auxiliary cathode ray storage device and a second input being connected to an output of the auxiliary readout signal switching member having another input thereof connected to a data output of the auxiliary cathode ray storage device, and one output connected to a gain control input of the video signal amplifier and another output connected to an input of a chopper having another input thereof connected to an output of the auxiliary control unit and an output connected to a readout amplifier, a second input of the readout amplifier being connected to an output of the main readout signal switching member and an output being coupled to an input of the indicator.

In the apparatus for detecting heterogeneity of water surface the variable reference voltage source may be connected to one input of the auxiliary cathode ray storage device via a switching member, a control input of the switching member being connected to an output of the auxiliary control unit.

The reference voltage source of the apparatus for detecting heterogeneity of water surface may be connected, via said switching member, to a data output of the auxiliary cathode ray storage device.

A compensation signal which is formed in the auxiliary cathode ray storage device with the help of the reference voltage source makes it possible to improve uniformity and homogeneity of image displayed on the indicator.

The hydrometeorological information processing and storage unit may be provided with a current sensor having its input connected to an input of the main cathode ray storage device, an auxiliary attenuator having an input connected to a second input of the video signal amplifier, a first input connected to an output of the current sensor and a second input connected to an output of the main control unit, and a current setting signal former having an output connected to a third input of the auxiliary attenuator, first and second inputs connected to outputs of the transceiver, third and fourth inputs connected to outputs of the driving generator, a fifth input connected to an output of the main control unit, the third input of the analog switch being connected to another output of the control unit.

BRIEF DESCRIPTION OF THE DRAWINGS

The invention will now be described with reference to specific embodiments illustrated in the accompanying drawings.

DETAILED DESCRIPTION OF THE INVENTION

Figure 1:
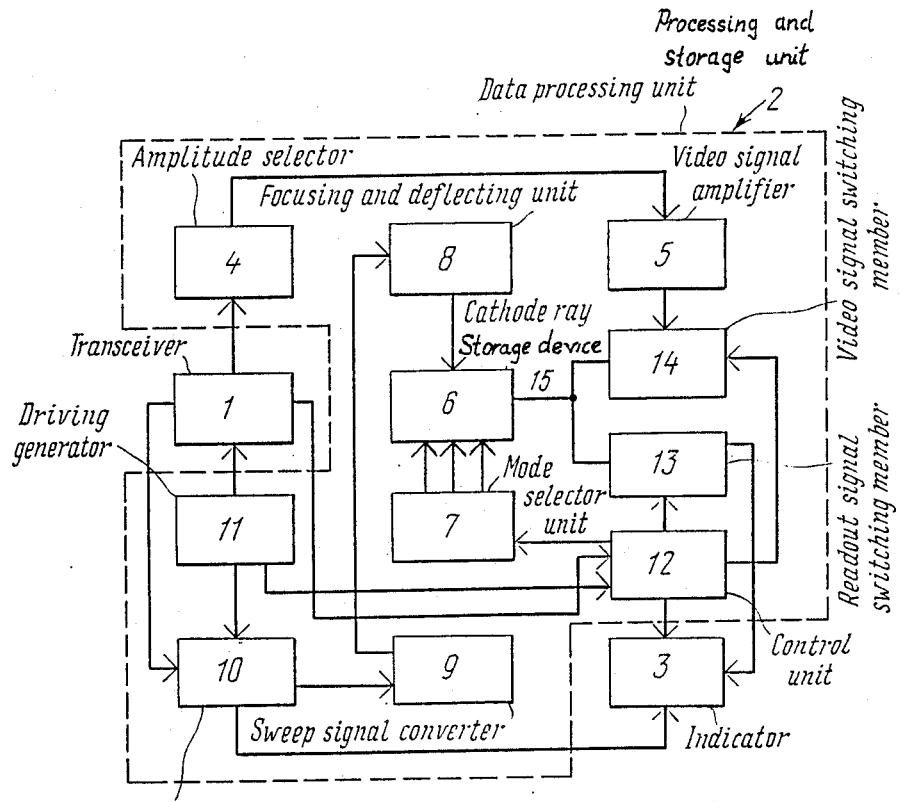
FIG. 1 shows a general block-diagram of an apparatus for detecting heterogeneity of sea surface according to the invention.

An apparatus for detecting heterogeneity of water surface comprises a source of a signal to be processed in the form of a standard radar transceiver 1 (FIG. 1) having an aerial unit (not shown in the FIGS.) which is series-connected to a hydrometeorological information processing and storage unit 2 and to an indicator 3.

An amplitude selector 4 connected to an input of the information processing unit 2 is used for its direct purpose, i.e. it ensures selection of a part of video signal within a pre-set amplitude range at any brightness level ranging from "white" to "black". The amplitude selector 4 is series-connected to a video signal amplifier 5 built around one of widely known circuits. For storage and processing of information on heterogeneity of water surface, the use is made of a cathode ray storage device 6 having cells which are scanned by electron beam with the possibility of multiple storage of analog signal. This cathode ray device may be, e.g. in the form of a conventional Lithacon cathode ray tube or its numerous analogs. One of them is described in the Journal of the Institute of Television Engineers of Japan, vol. 29, No. 10, pp. 813, 814.

The cathode ray device 6 is provided with a mode selector unit 7 (in this particular case this is a unit for switching over combinations of potentials at the electrodes of the cathode ray storage device) and with a beam control system which comprises a series circuit including a focusing and deflection system 8, a sweep signal converter 9 which is in the form of a conventional voltage-to-deflection coil current converter of the focusing and deflection system 8, and a conventional sweep voltage former 10. One output of the sweep voltage former 10 is connected to an input of said converter 9 and another output thereof is connected to a sweep input of the indicator 3. The abovementioned units, except for the indicator 3, also form part of the hydrometeorological information processing unit 2 which also comprises a known driving generator 11 generally used for the purpose, a control unit 12, a readout signal switching member 13, and a video signal switching member 14. A first input of the former 10 is connected to an output of the driving generator 11, a second output of the driving generator 11, which generates pulse trains for timing the whole apparatus, is connected to a clock input of the transceiver 1 and a third output is connected to a first input of the control unit 12.

If the abovementioned cathode ray tube is used as the cathode ray storage device 6, the control unit may be in the form of, e.g., that disclosed in the article by N. V. Druzhinin "On Automation Change of Modes of A Cathode Ray Storage Tube". Vestnik Kievskogo politekhnicheskogo instituta, No. 16, 1979, pp. 98–100.

In addition, the control unit 12, which ensures an automatic sequence of changes in operation modes of the whole apparatus, is connected with its second input of an output of the aerial unit of the transceiver 1. Control commands forming an ordered change in modes of the whole apparatus are consecutively formed at outputs of the control unit 12 in a digital code. A first output of the control unit 12 is connected to a control input of the mode selector unit 7, a second output is connected to a control input of the switching member for a video signal read out from the cathode ray storage device 6, and a third output is connected to a control input of a video signal switching member 14 for a video signal loaded into the cathode ray storage device 6. The switching members 13 and 14 comprise conventional analog signal switching circuits which may be in numerous forms built around integrated circuits. The mode selector unit 7 may be, e.g. in the form of a set of analog-to-digital converters or in the form of voltage switching circuits, the desired combinations of potentials for ensuring different modes of operation of the cathode ray storage device 6 being formed at the outputs thereof following a general command from the control unit 12. The mode selector unit 7 may also comprise individual potential switching circuits as disclosed in Thomson-CSF Groupement Electroniques, Data Tev 3140, January 1973, pp. 19-20.

The same reference gives examples of the implementation of the video signal amplifier 5 and driving generator 11 combined in one and the same circuit with the sweep voltage former 10 and sweep signal converter 9.

A blocking signal from a fourth output of the control unit 12 goes during mode switching over to a beam blocking input of the cathode ray tube of the indicator 3. An analog input of the switching member 13, together with an analog input of the switching member 14, is connected to a data output 15 of the cathode ray storage device 6, and an output of the transceiver 1 is connected to the analog input of the switching member 14 via the video signal amplifier 5.

In addition, the hydrometeorological information processing unit 2 (FIG. 2) may comprise a decorrelation unit 16 which is in the form of a programmed pulse frequency divider, i.e. in the form of a widely known counter with a variable count ratio forming the trace of the sawtooth sweep of the cathode ray device 6. The input of the unit 16 is connected to an output of the driving generator 11 and to an input of the sweep voltage former 10, and an output is connected to an input of the mode selector unit 7 of the cathode ray storage device 6.

Figure 3:
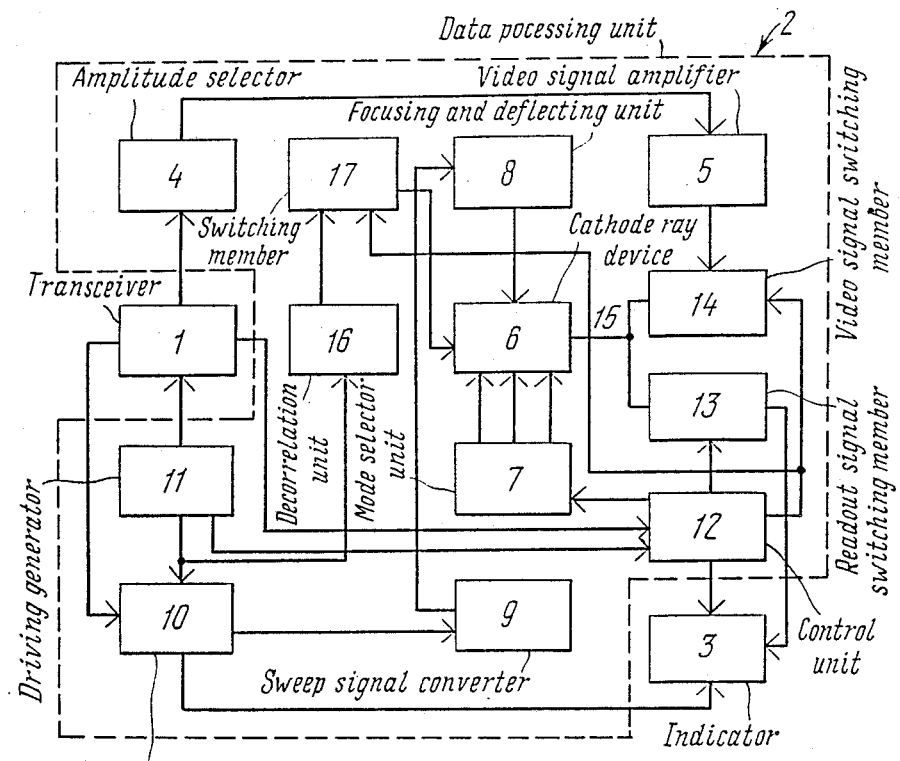
FIG. 3 is a block-diagram of another specific embodiment of an apparatus having a cathode potential switching member in a hydrometeorological information processing and storage unit according to the invention.

The hydrometeorological information processing unit 2 (FIG. 3) may also comprise a switching member 17 which may be in the form of a conventional coincidence circuit controlling a switch which switches over the potential of the cathode of the cathode ray storage device 6. One input of the switching member 17 is connected to an output of the decorrelation unit 16 and another input is connected to an output of the control unit 12. An output of the switching member 17 is connected to the cathode of the cathode ray storage device 6.

Figure 4:
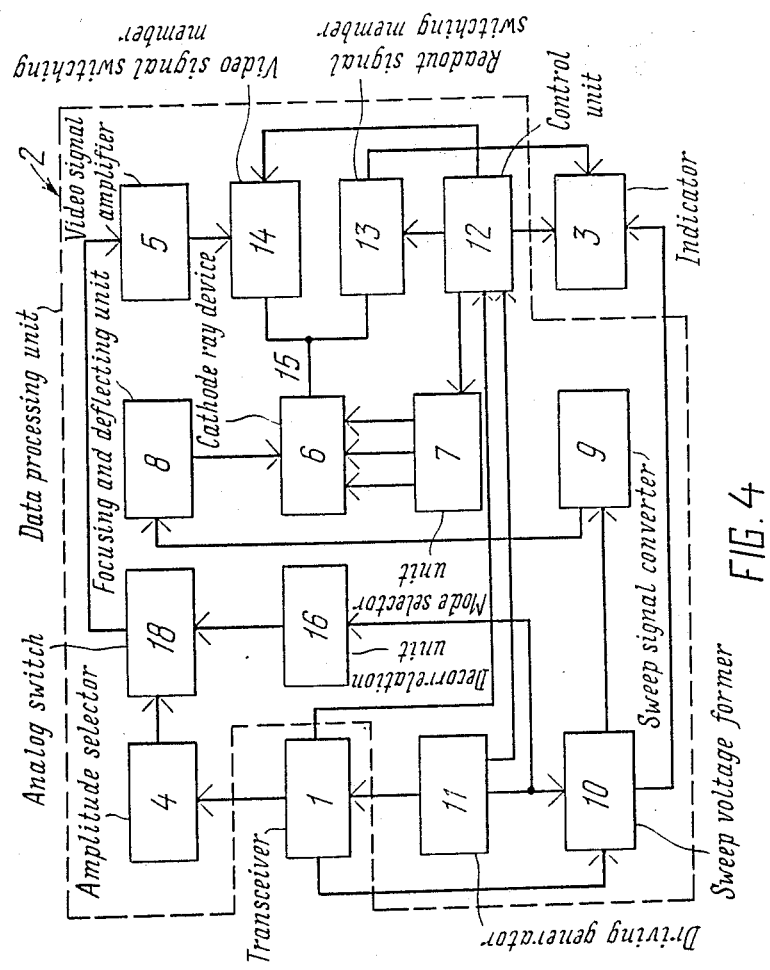
FIG. 4 is still another block-diagram of a specific embodiment of an apparatus having an auxiliary switch at the output of a decorrelation unit according to the invention.

The hydrometeorological information processing unit 2 (FIG. 4) may also comprise an analog switch 18 which controls the passage of a signal to the input of the video signal amplifier 5. A signal input of the analog switch 18 is connected to an output of the amplitude selector 4 and a control input is connected to the output of the decorrelation unit 16.

Figure 5:
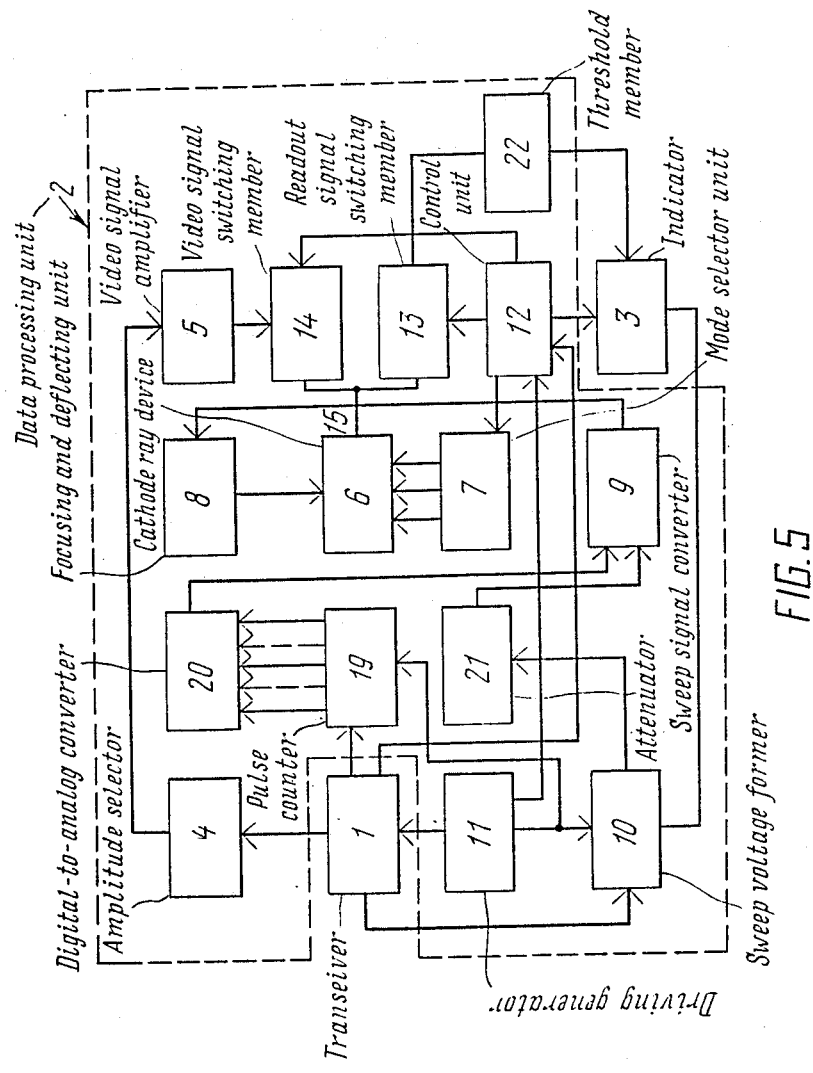
FIG. 5 is a block-diagram of a specific embodiment of an apparatus wherein a beam control system is provided with a pulse counter according to the invention.

In addition to the main focusing and deflection system 8, sweep signal converter 9 and sweep voltage former 10, the beam control system may also comprise, as shown in FIG. 5, a series circuit including a conventional pulse counter 19 and a conventional digital-to-analog converter 20. An output of the digital-to-analog converter 20, which generates a stepwise varying voltage, is connected to an input of the sweep signal converter 9. Another input of the converter 9 is connected, via an attenuator 21, to an output of the sweep voltage former 10. The attenuator 21 is designed for varying amplitude of sawtooth voltage which goes from the output of the sweep voltage former 10. A threshold member 22 inserted between the signal input of the indicator 3 and the input of the switching member 13 suppresses a part of signal having an amplitude which does not exceed a pre-set level. It should be noted that a count input of the pulse counter 19 is connected to the input of the main control unit 12 and to the third output of the driving generator 11. Each return trace pulse of the sawtooth sweep will consecutively shift the pulse counter 19 at one step. The reset input of the pulse counter 19 is connected to the output of the aerial unit of the transceiver 1. The pulse counter 19 is reset by a sweep starting pulse of the aerial unit of the transceiver 1.

Figure 6:
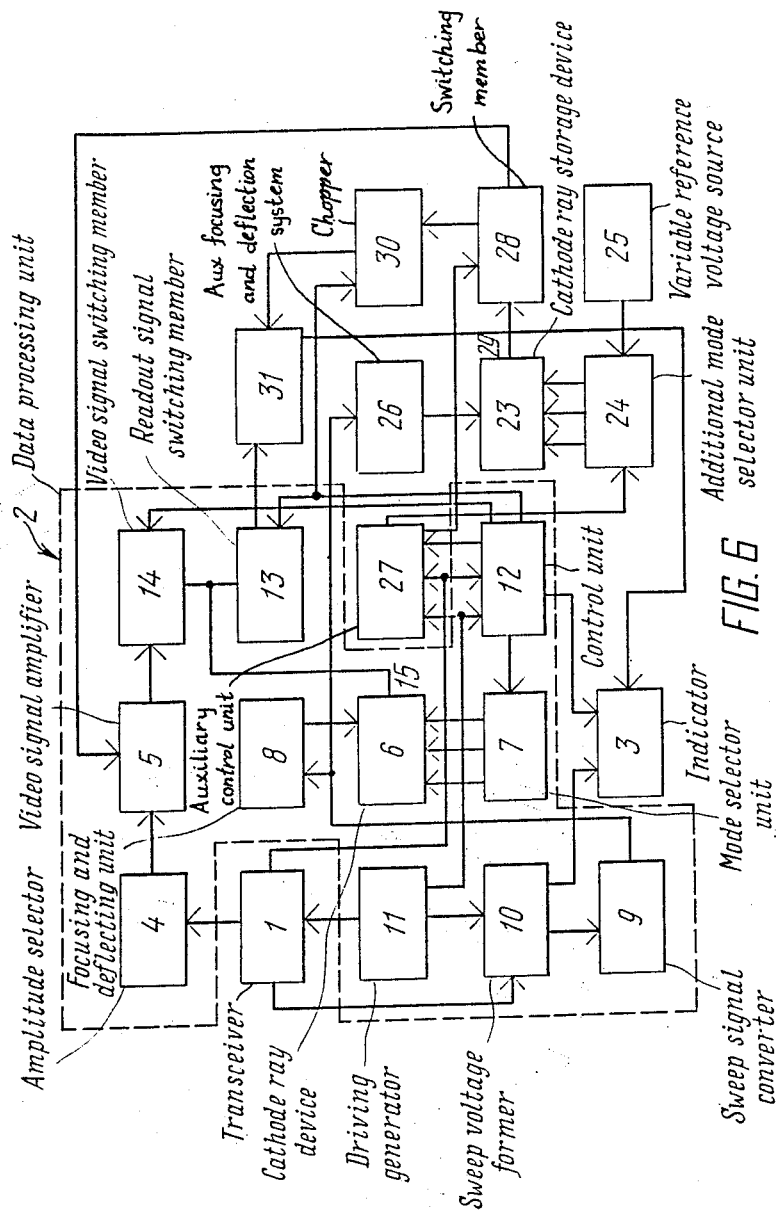
FIG. 6 is a block-diagram of a specific embodiment of an apparatus having an auxiliary cathode ray storage device provided with an auxiliary focusing and deflection system, a mode selector unit, a control unit and a reference voltage source connected to the mode selector unit according to the invention.

The apparatus shown in FIG. 6 also comprises an auxiliary cathode ray storage device 23 having its own mode selector unit 24 and a variable reference voltage source 25 connected thereto.

All the abovementioned units which have their auxiliary counterparts will be referred to hereinbelow as main units.

Electron beam in the auxiliary cathode ray storage device 23 is controlled by an auxiliary focusing and deflection system 26 having an input which is connected in parallel with the input of the main focusing and deflection system 8 and is connected to the output of the sweep signal converter 9. An input of the auxiliary mode selector unit 24 is connected to an output of an auxiliary control unit 27. An input of the auxiliary control unit 27 is connected to an output of the main control unit 12 and is designed, when both units work in the "write" mode, for switching over the unit 27 for "readout" mode when one complete write cycle is over in the unit 12. Another input of the auxiliary control unit 27 is tied together with a like input of the main control unit 12 and is connected to an output of the driving generator 11. A third input of the auxiliary control unit 27 is connected to the third input of the control unit 12 and is connected to the sweep signal output of the aerial unit of the transceiver 1 which generates marker pulses recording one complete revolution of the aerial. Another output of the auxiliary control unit 27 is connected to a control input of an auxiliary signal switching member for a signal read out from a data output 29 of the auxiliary cathode ray storage device 23. An output of the switching member 28, is connected to a gain control input of the video signal amplifier 5 and another output is connected to an analog input of a chopper for a signal read out from the auxiliary cathode ray storage device 23. A control input of the chopper 30 is connected to an output of the main control unit 12 and to a control input of the main readout signal switching member 13 and an output is connected to an input of a readout signal amplifier 31. Another input of the readout signal amplifier 31 is connected to an output of the main readout signal switching member 13 and an output is connected to a video signal input of the indicator 3.

The reference voltage source 25 (FIG. 7) may also be connected, via a switching member 32, to the cathode of the auxiliary cathode ray storage device 23. A control input of the switching member 32 is connected to a second input of the auxiliary control unit 27.

Figure 8:
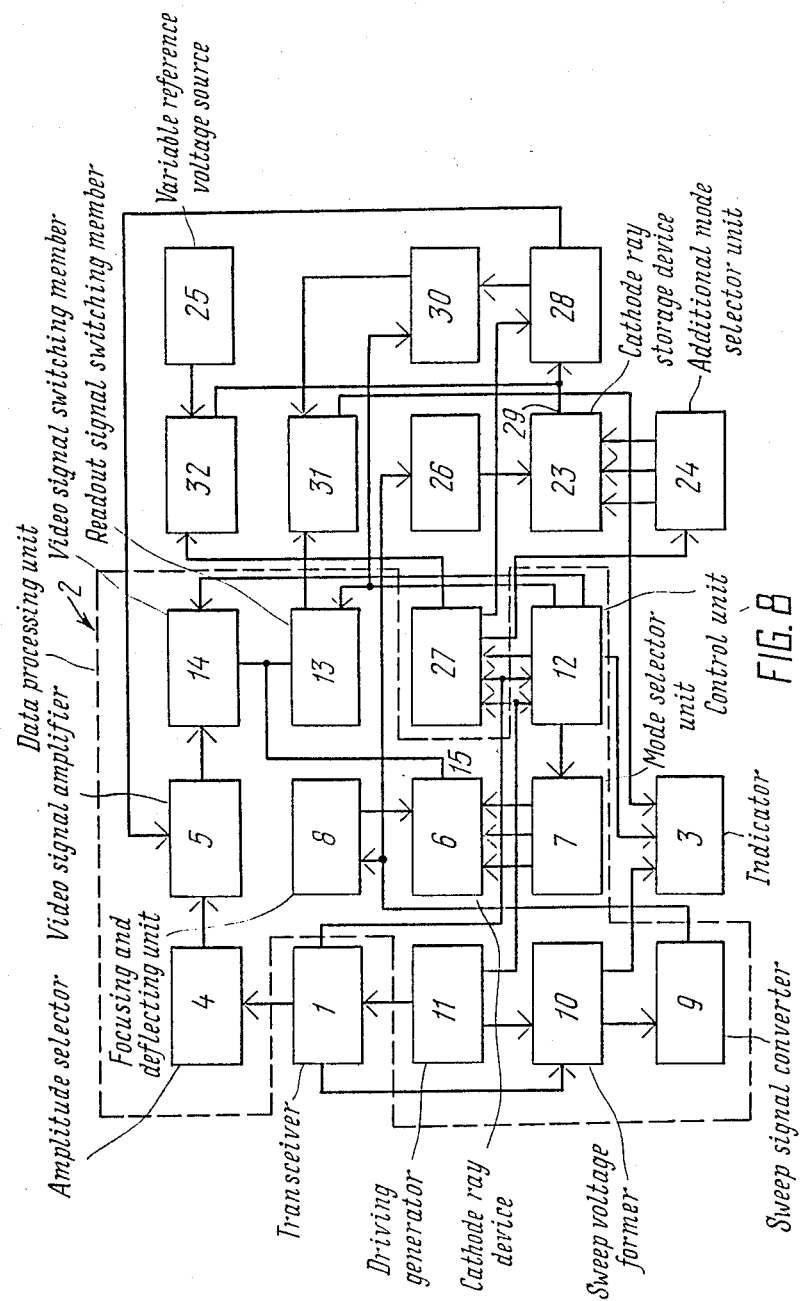
FIG. 8 is a block-diagram of a specific embodiment of an apparatus wherein a reference voltage source is connected, via a switching member, to a data output of an auxiliary cathode ray storage device according to the invention.

In another embodiment (FIG. 8), the input of the switching member 32 may be connected to a data output of the cathode ray storage device 23.

Figure 9:
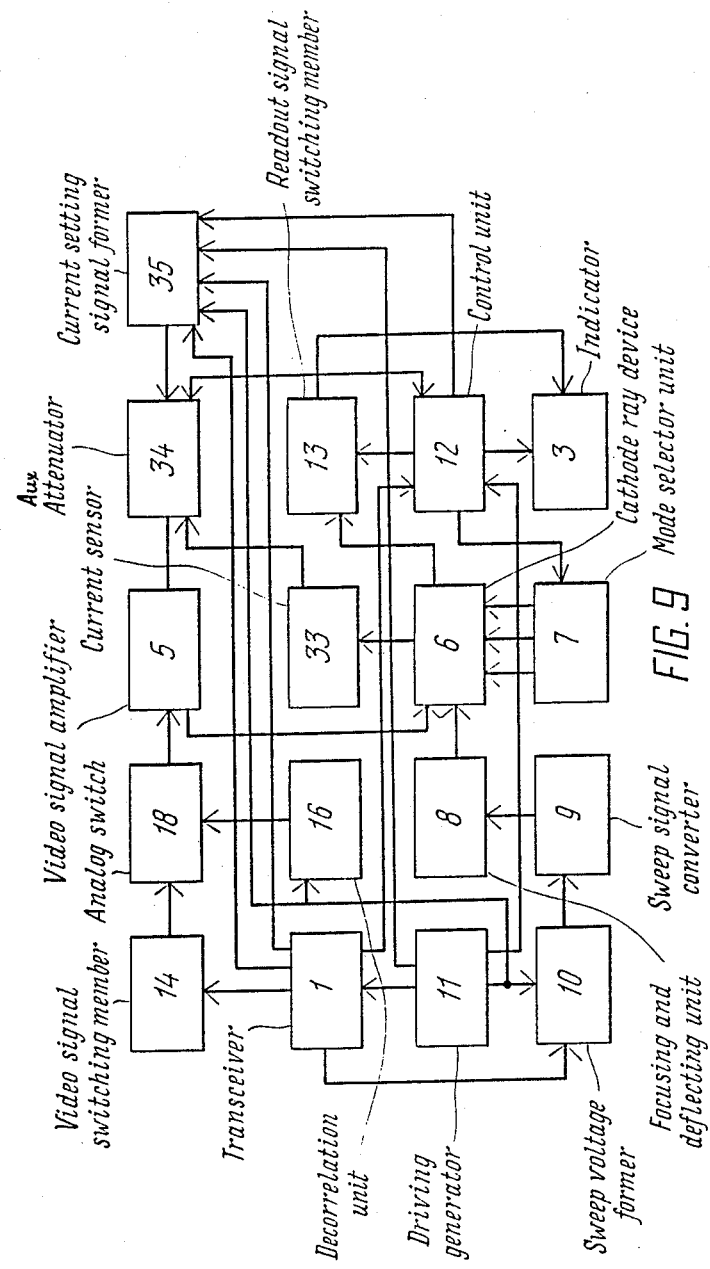
FIG. 9 is a block-diagram of a specific embodiment of an apparatus wherein the hydrometeorological information processing and storage unit also comprises a current sensor, an auxiliary attenuator and a computer according to the invention.

The hydrometeorological information processing unit 2 shown in FIG. 9 may also comprise a current sensor 33, an auxiliary attenuator 34, and a current setting signal former 35. The current sensor 33 is connected to the cathode of the main cathode ray storage device 6 and transmits information on the value of current of the main cathode ray storage device 6 to an input of the auxiliary attenuator 34 having another input connected to a blanking signal output of the main control unit 12, and a third input connected to an output of the former 35. A first input of the former 35 is connected to a clock pulse output of the driving generator 11. A second input of the current setting signal former 35 is connected to an output of the driving generator 11 at which pulses of forward range scan of the radar (not shown) are formed. Third and fourth inputs of the former 35 are connected to outputs of the transceiver 1 at which signals carrying information on aerial rotation speed and pulses recording one complete revolution of the aerial, respectively, are formed. A fifth input of the former 35 is connected to an output of the main control unit 12 from which information is received on the number of signal accumulation cycles that has to be implemented. An output of the auxiliary attenuator 34 is connected to a gain control input of the video signal amplifier 5. A third input of the switch 18 is connected to an output of the main control unit 12 from which a command is sent to unblock the switch 18 in the "write" mode.

Figure 10:
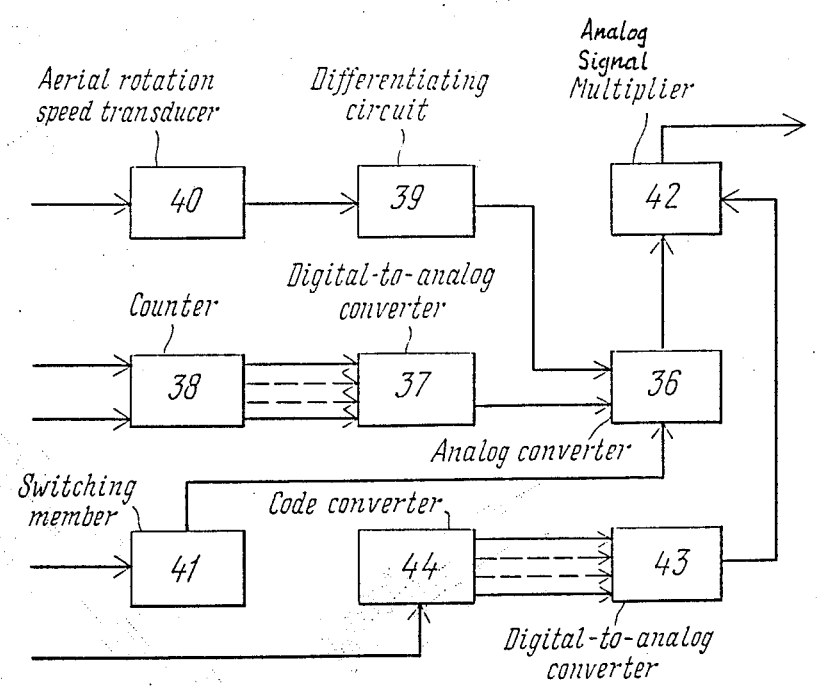
FIG. 10 is a block-diagram of a specific embodiment of a current setting signal former according to the invention.

A structural diagram of the preferred embodiment of the current setting signal former 35 is shown in FIG. 10. The former 35 is built around an analog converter 36 which is in the form of a widely known circuit of a non-linear analog signal converter having a signal input connected to an output of a digital-to-analog converter 37 having its digit inputs which are connected to outputs of a counter 38 having one input thereof, which is a clock pulse input, connected to the driving generator 11, and another input which is a forward range scan pulse input of the radar (not shown in the drawings). A scaling input of the converter 36 is connected, via a differentiating circuit 39 of a conventional type which is used for its direct purpose, to a conventional aerial rotation speed transducer 40 having an input connected to the output of the aerial unit. An input for selecting a desired functional relationship of the output voltage of the converter 36 is connected to an output of a switching member 41, and an output is connected to a first input of a conventional analog signal multiplier 42. Another output of the multiplier 42 is connected to an output of a digital-to-analog converter 43 having its digit inputs connected to a conventional code converter 44 having an input which is an input of a command determining the number of accumulated scans. The input of the switching member 41 is the input of a code of the waveband which is used at a given moment by the range radar.

Operation of the apparatus for detecting heterogeneity of water surface (FIG. 1) is divided into several modes:

data readout;
preparation for data loading;
data loading.

After switching-on power supply following a command formed in the form of a digital code at the outputs of the main control unit 12, the apparatus will be every time automatically set up to the "readout" mode.

The sweep voltage former 10 driven by the generator 11 will generate a train of sawtooth sweep voltages amplitude-modulated by a sine-cosine component fed from the aerial unit of the transceiver 1.

The resultant sweep voltage is fed to the input of the converter 9 wherein it is converted into deflection currents of the focusing and deflection system 8. At the same time, a sweep voltage is fed from another output of the former 10 to the sweep input of the indicator 3.

This ensures synchronism and inphase state of the sweep in the aerial unit of the transceiver 1, sweep of the indicator 3 and sweep of the main cathode ray storage device 6 which is part of the hydrometeorological information processing unit 2. Electron beam controlled by the sweep voltage in the main cathode ray storage device 6 switches over, in a pre-set sequence, memory cells to connect them to the data output 15 of the main cathode ray storage device 6. When set up to the "readout" mode, the mode selector unit 7 of the main cathode ray storage device 6 forms a combination of potentials ensuring the electrical data readout mode for reading out the data stored in the main cathode ray storage device 6. The switching member 14 disables signal passage from the video signal amplifier 5 to the data output 15 of the main cathode ray storage device 6, and the switching member 13 lets through a signal read out from the data output 15 to go to the video signal input of the indicator 3. An analog signal which acquires the amplitude value in accordance with the contents of the memory cell which is switched-on at a given moment will be generated at the data output 15. This signal passes through the switching member 13 to the indicator 3 wherein it controls brightness of a pixel glowing on the screen of the indicator 3. As a result of the consecutive scanning of all cells of the main cathode ray storage device 6, a half-tone image of the information stored in the memory is formed on the screen of the indicator 3.

Following the command "Start", the main control unit 12 generates a command which switches over the apparatus for the "preparation" mode.

The mode selector unit 7 of the main cathode ray storage device 6 will, following this command that ensures the mode of preparation for loading into the main cathode ray storage device 6, form a new combination of potentials which is necessary to carry out erasing of the earlier stored data if any. The switching members 13 and 15 will block the passage of both loaded and readout signals at the data output 15. By consecutively switching over memory cells of the main cathode ray storage device 6, the electron beam will erase data available therein.

When all memory cells are cleaned, the main control unit 12 will generate the command "Write", and the apparatus will be automatically switched over for data write mode. The unit 7 will form at the electrodes of the main cathode ray storage device 6 potentials corresponding to the electrical data "write" mode for loading into the memory. The switching member 14 enables the passage of the loaded signal formed from the radar signal reflected from the sea surface to the data output 15, which goes, via the aerial unit, to the transceiver 1, is detected and fed to the input of the amplitude selector 4 and further to the video signal amplifier 5. The amplitude selector lets through to the input of the video signal amplifier 5 only that part of the video signal the amplitude of which is within the range pre-set in the amplitude selector 4 so as to ensure maximum contrast of heterogeneity being observed against the background of the water surface. Further the video signal amplified in the amplifier 5 will go through said switching member 14 to the data output 15 of the main cathode ray storage unit 6. The beam scanned over a target surface of the main cathode ray storage device 6 is modulated by this video signal. As a result, a corresponding beam current changes with a respective change in the charge applied by the beam to a portion of the target which is switched over by the beam at a given time moment. The combination of charges on the target surface obtained during one scan cycle of the aerial of the transceiver 1 forms a potential pattern. As it was mentioned above, owing to the synchronism and inphase state, the angular coordinate of the aerial is strictly linked with the sweep of the main cathode ray storage device 6. Consequently, to the value of the signal reflected from three-dimensional objects corresponds a proportional value of a signal loaded into a certain memory cell. During loading, a signal reflected during several scan cycles of the aerial from objects present for a long time at a certain point in space, such as oil or polymeric slicks, stationary seas formations, steady surface currents and various navigation signs, and the like, will be accumulated in one and the same memory. At the same time, signals caused by noise and seas ripples, splashes, and the like, which are of the noise nature, will be integrated and stored in all memory cells as a background component.

From the physics of the process of signal accumulation disclosed earlier (cf. B. Courian, J. Deschamps. Les Tubes à Memoire Enregistreurs (TME) "in Revue Technique" Thomson-CSF, vol. 3, No. 4, December 1977) it will be apparent that the signal-to-noise ratio increases in comparison with a single write cycle. The provision of the amplitude selector 4 makes it possible to select promptly the most informative part within the whole amplitude range of the written signal. This facility allows heterogeneities of water surface to be effectively detected under various seas and winds. The number of accumulation cycles is set-up by the operator in the main control unit 12 before feeding the command "Start". When loading of the pre-set number of accumulation cycles is over, the main control unit 12 will automatically switch over the apparatus to the abovedescribed "readout" mode. A fragment of the sea surface will be then displayed on the screen of the indicator 3 showing heterogeneities if any.

With a high frequency of sounding pulses used in conventional radar stations there is a correlation of noise signals reflected from one and the area of the water surface in several neighbouring range scans of the radar station. This results in the appearance of a plurality of strong overshoots in the loaded signal which, during subsequent visualization of the information, will hamper the detection of heterogeneities of water surface. In order to avoid this phenomenon, it is necessary, before storing the radar signal, to carry out preliminary decorrelation of the noise signal going from the water surface, i.e. to store only that part of the signal reflected from the water surface which is available in the range scans spaced in time longer than, or equal to, the time of effective decorrelation of noise signals reflected from the water surface.

Figure 2:
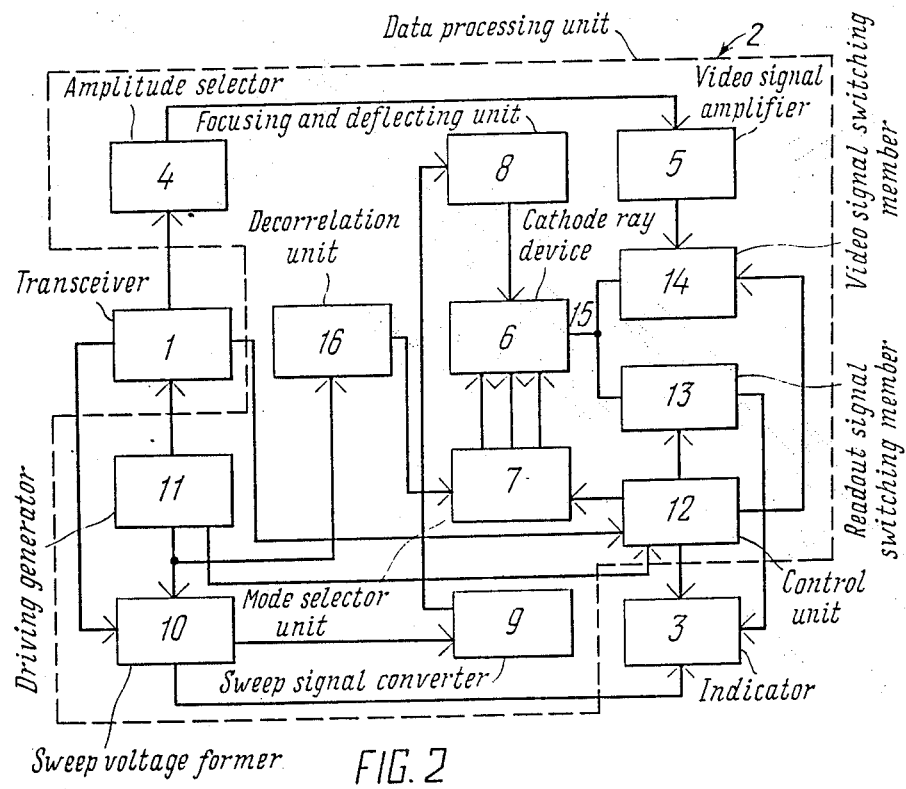
FIG. 2 is a block-diagram of one specific embodiment of an apparatus having a decorrelation unit in a hydrometeorological information processing and storage unit according to the invention.

For that purpose, the apparatus shown in FIG. 2 is provided with the decorrelation unit 16 which is in the form of a programmed counter/divider which does not change the abovedescribed operation of the apparatus in the data readout and preparation modes. In the "write" mode, pulses from the output of the driving generator 11 go to the input of the decorrelation unit 16, which will form the radar range sweep time. Following a pulse train arriving at the unit 16, a new train is formed in accordance with the division factor programmed in the counter. The pulses formed in the unit 16 are fed from its output to one of the inputs of the mode selector unit 7 to unblock electron beam of the main cathode ray storage device 6 by changing modulator potential at time moments corresponding to the control action of pulses arriving from the output of the unit 16. During repeated accumulation of a signal, regularly repeated radar pulses reflected from heterogeneities or other targets are integrated in the main cathode ray storage device 6 and increase in amplitude. At the same time, the decorrelated pulses from the water surface will acquire a nature close to noises and will be stored in the form of a noise component, the background caused by them being the more uniform, the larger is the number of cycles of accumulation of the radar signal reflected in each direction scan.

Decorrelation of the noise signal from the water surface may also be carried out if the decorrelation unit 16 (FIG. 3) also comprises a unit 17 for switching over potential of the cathode of the main cathode ray storage device 6. In this case a pulse train formed during the data "write" mode at the output of the decorrelation unit 16 is fed to the first input of the unit 17 for switching potential of the cathode. A control signal is fed from the output of the main control unit 12 to the second input of the unit 17 for a time during which the data write mode is implemented.

If these signals arrive simultaneously, a constant potential is switched over at the output of the unit 17 for switching over a potential of the cathode, which has the value and polarity necessary for unblocking electron beam in the main cathode ray storage device 6. During this time interval data obtained during one range scan of the radar station is stored. If one of the input signals is not available in the unit 17, the cathode of the main cathode ray storage device 6 will be switched over to the ground potential, and electron beam will be blocked. The degree of correlation of the noise signals in neighbouring range scans is controlled by varying the division factor of the counter (not shown) in the decorrelation unit 16.

Decorrelation of noise pulses from seas may also be carried out by suppressing video signal in several neighbouring range scans of the radar station arriving from the output of the amplitude selector 4. For that purpose, the decorrelation unit 16 shown in FIG. 4 also comprises the analog switch 18 which is unblocked by pulses formed at the output of the decorrelation unit 16. The signal reflected from the water surface and received in all range scans formed in the transceiver 1 is fed, via the amplitude selector 4, to the signal input of the analog switch 18. The switch 18 controlled by pulses arriving from the output of the decorrelation unit 16 lets through to the input of the video signal amplifier 5 only that part of the signal which is related to the time intervals of the range scans formed in the unit 16. The signal formed in the data write mode passes through the unblocked video signal switching member 14 to the data output of the main cathode ray storage device 6 in which it is stored. The remaining units function in the same manner as described above for the "write" mode.

Owing to decorrelation of the noise signal received from the water surface carried out by partial cancellation during passage of signals received during neighbouring range scans, there is no ordered accumulation of a noise signal from the water surface in the stored signal. This is due to the fact that the time interval between neighbouring scans is chosen to be longer than the time of existence of individual reflectors on the water surface. The noise is accumulated, like interferences, in the form of a uniform background without detriment to the detection of heterogeneities.

If a signal reflected from the water surface is loaded not in the form of a radial-circular raster, but rather in the form of a rectangular raster, one of the embodiments of the apparatus according to the invention may be used to materially increase probability of detection of heterogeneities of water surface. This is achieved by eliminating a specific background component which is manifest upon mutual overlap of several neighbouring lines of the radial-circular raster during signal loading. The effect manifests itself in the form of a higher brightness of image in the center of the screen of the indicator 3 gradually decreasing towards its margins. During repeated loading of the analog signal, the background component becomes so high that the image at the center of the screen forms a continuous light spot. To avoid this, electron beam sweep in the main cathode ray storage device 6 is carried out in the following manner. Sawtooth sweep voltage corresponding to the radar station range scan is fed from the output of the sweep voltage former 10, via the attenuator 21, to the input of the sweep voltage converter 9 and further to the focusing and deflection system 8. The beam sweep in the main cathode ray storage device 6 is carried out in this manner along one orthogonal coordinate. The sweep in the direction of the second coordinate is carried out by a stepwise-varying voltage fed from the output of digital-to-analog converter 20 to the second input of the converter 9. Moving the output voltage of the digital-to-analog converter 20 a step up is carried out by shifting the counter 19 at one step by the return track pulse of said sawtooth sweep. For exact alignment of the sweep start position in the main cathode ray storage device 6 which is carried out by the digital-to-analog converter 20 with the direction position of the aerial of the radar station, the counter 19 is reset by marker pulses generated when the aerial passes by a pre-set point of its angular position. In this embodiment of the apparatus, for the sake of clarity, this pulse is a marker pulse "course" of the radar station.

If conversion of the radial-circular raster formed by the aerial unit of the transceiver 1 into rectangular raster was carried out in the data "write" mode in the main cathode ray storage device 6, a reverse conversion of the rectangular raster stored in the cathode ray storage device 6 into radial-circular raster will take place on the screen of the indicator 3 upon transition into the data "readout" mode. The intermediate conversion of the scan into rectangular raster used in the apparatus in the "write" mode makes it possible to obtain a large number of signal accumulation cycles while avoiding the formation of the abovementioned background component at the center of the screen.

This method of data accumulation allows the threshold member 22 to be used in the apparatus. The threshold member 22 cuts-off the accumulated background noise and lets through to the indicator 3 only that part of the signal that carries information on heterogeneity of water surface.

This apparatus makes it possible to achieve a material improvement of contrast of the heteroegenity image on the screen of the indicator 3 and remove the background hampering the operator's observational work.

The background component may also be eliminated by adding to the signal being loaded, which is formed by different methods, a compensation signal of a certain form which takes into account write overlap in the radial-circular raster, e.g. by means of a compensation signal used for varying the gain of the video signal amplifier 5. For forming a compensation signal, the apparatus according to the invention shown in FIG. 6 comprises an auxiliary cathode ray storage device 23 which has an electron beam sweep synchronous, and in phase with the sweep of the main cathode ray storage device 6 owing to the parallel connection of the main focusing and deflection system 8 and the auxiliary focusing and deflection system 26 to the output of the sweep signal converter 9.

This apparatus functions in the following manner in the data "write" mode.

The main control unit 12, after being changed over for the "write" mode, will switch over for this mode the auxiliary control unit 27. The video signal will thus be stored in the main cathode ray storage device 6 as described above. At the same time, a constant level signal from the reference voltage source 25 connected, via the mode selector unit 24, to the auxiliary cathode ray storage device 23 is stored in the auxiliary cathode ray storage device 23. After the loading of the first complete circular scan is terminated, a command from the main control unit 12 will switch over the auxiliary control unit 27 from the "write" mode to the data "readout" mode, and this unit will generated a command which unblocks the auxiliary readout signal switching member 28, and the compensation signal stored in the auxiliary cathode ray storage device 23 will go from the output 29, via the readout signal switching member 28, to the video signal amplifier 5 to control its gain during data loading into the main cathode ray storage device 6. When the write mode in the main cathode ray storage unit 6 is over, the main control unit 12 will switch over the whole apparatus for the data readout mode. Consequently, the stored data will be fed from the auxiliary readout signal switching member 28 through the readout amplifier 31 to the indicator 3. At the same time, the chopper 30 controlled by the "Readout" command from the main control unit 12 will let through the compensation signal to the readout amplifier 31 to control its gain. This is necessary to make up, in the signal going to the indicator 3, for a component appearing in the stored signal during its loading into the main cathode ray storage device 6 from the first direction scan carried out without a compensation signal.

A potential formed by the reference voltage source 25 may be varied, e.g. upon a change in the rotation speed of the aerial or frequency of sounding pulses of the radar station. Forming a compensation signal in the auxiliary cathode ray storage device 23 makes it possible to take into account such special features of a radar system as, e.g. non-uniformity of rotation of the aerial because of mechanical plays or strong wind loads.

Figure 7:
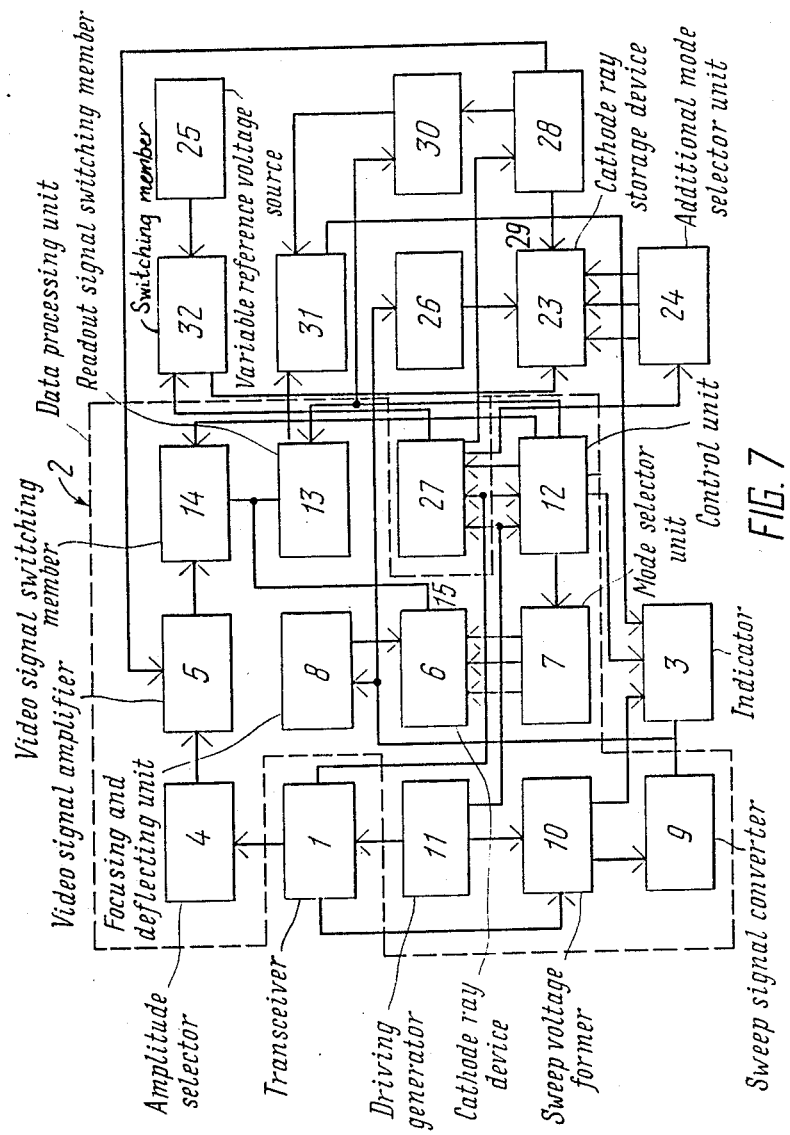
FIG. 7 is a block-diagram of a specific embodiment of an apparatus wherein a reference voltage source is connected, via a switching member, to a cathode of an auxiliary cathode ray storage device according to the invention.

A compensation signal may be formed by providing the apparatus with a switching member 32 of the reference voltage source 25 (FIG. 7). During formation of a compensation signal by loading a constant voltage into the auxiliary cathode ray storage device 23, the switching member 32, following the "Write" command from the output of the auxiliary control unit 27 will connect the reference voltage source 25 to the cathode of the auxiliary cathode ray storage device 23. A constant density electron beam swept into a radial-circular raster will thus form in the auxiliary cathode ray storage device 23 a compensation signal of the desired form.

A compensation signal may be formed by connecting the reference voltage source 25 (FIG. 8), via the switching member 32, to the data output 29 of the cathode ray storage device in the auxiliary cathode ray storage device 23. Following the "Write" command from the output of the auxiliary control unit 27, the reference voltage is fed, in the "write" mode, to the abovementioned data output 29 to form the desired level of the signal being loaded.

The uniformity of image over the entire field may be improved, and the background component caused by the concurrent interplay of several factors may be avoided, by providing in the hydrometeorological information processing unit 2 the current sensor 33, the auxiliary attenuator 34, and the current setting signal former 35 (FIG. 9).

This apparatus will function differently in the "write" mode which is carried out in the following manner.

A radar signal reflected from the water surface is received and detected by the transceiver 1 and then a part thereof, which has an amplitude within a pre-set range, goes from the output of the amplitude selector 4 to the signal input of the switch 18 which is unblocked by a command from the output of the main control unit 12. A set of commands are formed at the outputs of the main control unit 12 in the "write" mode as described above to switch over the main cathode ray storage device 6 for the "write" mode. The main readout signal switch 13 is blocked. A command carrying information on how many full scans it is necessary to write is fed to the former 35. In addition, the former 35 receives from the driving generator 11 a set of clocks and a pulse within the time interval of which the range sweep of the radar is formed. Within the abovementioned interval, the former 35 will form a signal to control the auxiliary attenuator 34 taking into account the data on angular velocity of the aerial and the radar range band fed from the transceiver 1. The current sensor 33 inserted in the cathode circuit of the main cathode ray storage device 6, the auxiliary attenuator 34 having its input connected to one of the outputs of the video signal amplifier 5 and the output connected to the modulator of the main cathode ray storage device 6, form a circuit of a feedback servo system stabilizing current of the cathode ray storage device 6.

The decorrelated signal from the output of the switch 18 goes to the second terminal of the differential input of the video signal amplifier 5. The video signal amplifier 5, owing to the provision of the above-described feedback, will linearly process a change in the input signal in the form of a change in current of the beam of the main cathode ray storage device 6.

A compensation signal going from the former 35 to the other input of the auxiliary attenuator 34 will, in accordance with the law of its variation, cause a change in current in the feedback servo system, and the resultant signal will be multiplexed in the video signal amplifier 5 with the signal being loaded. As the input signal controls current of the main cathode ray storage device 6 rather than the control voltage, e.g. at the modulator of the main cathode ray storage device 6 (not shown), quality of the stored data will be better. This is explained by the fact that the modulation characteristic of the cathode ray storage device 6 is non-linear and depends on structural features of the tube, and relationship current v. charge pattern in the cathode ray storage device 6 is linear. For the rest, the "write" mode will not differ from that described above. In the "readout" and "preparation" modes the switch 18 will block the passage of the signal to the input of the amplifier 5, and the feedback servo system will be used for additional stabilization of current of the cathode ray storage device 6 in these modes. In all cases, for blanking return trace in the cathode ray storage device 6, a blanking signal is fed to the auxiliary attenuator 34 from the output of the main control unit 12. For a better understanding, let us consider in greater detail operation of the former 35 (FIG. 10). When a radar range scan pulse appears at the input of the counter 38, the counter is started in the serial count mode by clocks fed to the other input thereof from the driving generator 11 (FIG. 9). The digital-to-analog converter 37 controlled by the counter 38 (FIG. 10) will form at its output a stepwise increasing voltage from which the analog signal converter 36 will form a signal making up for an overlap of lines of the radial-circular raster in the "write" mode. Since frequency of sounding pulses of the radar, hence the degree of overlap of the lines being loaded, depend on the radar range band used at this moment, the code of the chosen band is fed to the input of the switching member 41 to control it. The switching member 41 will switch over the internal connections in the analog signal converter 36 in a combination which is necessary to obtain a desired form of the compensation signal. Since rotation speed of the radar aerial may vary during one and the same revolution by gusts of wind or under the action of other factors, information on rotation speed received from the output of the speed transducer 40 is fed to the differentiating circuit 39. The differentiating circuit 39 generates a signal proportional to a change in rotation speed of the radar aerial. This signal goes to a scaling input of the analog signal converter 36 to change the form of the signal at the output of the converter 36 in accordance with the instantaneous aerial rotation speed. Because of a limited dynamic range of the cathode ray storage device 6 (FIG. 9), it is necessary to vary the amplitude of the signal being loaded depending on the desired number of data accumulation cycles. For that purpose, information on the chosen number of data accumulation cycles is fed in the coded form to the code converter 44 (FIG. 10) and from this converter is gone to the inputs of the digital-to-analog converter 43. A constant level signal is formed at the output of the digital-to-analog converter 43 which is mixed in the multiplier 42 with a signal formed by the analog signal converter 36. The complete compensation signal goes from the output of the multiplier 42 to the gain control input of the video signal amplifier 5 (FIG. 9).

The apparatus makes it possible to carry out a prompt detection of heterogeneity of water surface, and it is much more handy in operation because manual tuning of operation modes is dispensed with and sensitivity in search for heterogeneities is greatly improved.

The apparatus according to the invention may be installed on the coast or on board various carriers such as vessels, aircraft, and the like, and it may be used for a prompt detection of various heterogeneities, in particular, for a prompt detection of various pollutants of water surface.

This information received in uninterrupted manner day and night may be used for controlling pollution of water areas of ports, coastal zones, holiday resorts and also for the detection of vessels breaking sanitary rules. All these measures have to do with the effective protection of the environment. Design features used in the apparatus makes it possible to improve probability of detection of slicks and other surfactants and allow the operator to choose optimal operation mode.

We claim:

1. An apparatus for detecting heterogeneity of water surface, comprising:
   a transceiver generating sounding radar pulses, receiving a radar signal reflected from the water surface and forming a video signal carrying hydrometeorological information on heterogeneity of the water surface:
   a hydrometeorological information processing unit connected to said transceiver and comprising:
      an amplitude selector connected to an output of said transceiver and selecting a part of the video signal in an amplitude range ensuring maximum contrast of the heterogeneity against the background of the water surface;
      a video signal amplifier having an input connected to an output of said amplitude selector;
      a video signal switching member having an input connected to an output of said video signal amplifier;
      a cathode ray storage device having a plurality of inputs and one data output which is connected to an output of said video signal switching member;
      a mode selector unit of the cathode ray storage device connected to said cathode ray storage device;
      a readout signal switching member controlling a signal read out from said cathode ray storage device, an input of said switching member being connected to said data output of said cathode ray storage device;
      a driving generator having one of outputs thereof connected to an input of said transceiver;
      a control unit having one input connected to another output of said transceiver, another input connection to one of the outputs of said driving generator, one output connected to another input of said readout signal switching member, a second output connected to said video signal switching member, and a third output connected to said mode selector unit of the cathode ray storage device;
   an electron beam control system having:
      a sweep voltage former having one input connected to another output of said driving generator and another input connected to one of the outputs of said transceiver;
      a sweep signal converter having an input connected to an output of said sweep voltage former;
      and a focusing and deflection system having an input connected to an output of said sweep signal converter and an output connected to said cathode ray storage device;
   an indicator having a plurality of inputs and an output, one of said inputs being connected to the output of said readout signal switching member, a second input being connected to the output of said sweep voltage former, and a third input being connected to one of the outputs of said control unit.

2. An apparatus according to claim 1, wherein said hydrometeorological information processing unit comprises:
   a decorrelation unit in the form of a programmed pulse frequency divider having an input connected to the output of said driving generator and an output connected to one of the inputs of said mode selector unit.

3. An apparatus according to claim 2, wherein said hydrometeorological information processing unit also comprises:
   a switching member for potential of said cathode ray storage device having one input connected to the output of said decorrelation unit and another input to one of the outputs of said control unit, and an output connected to the input of said cathode ray storage device.

4. An apparatus according to claim 2, wherein said hydrometeorological information processing unit comprises a switch having one input connected to the output of said decorrelation unit, another input connected to the output of said amplitude selector and an output connected to the input of said video signal amplifier.

5. An apparatus according to claim 1, wherein said electron beam control system of said hydrometeorological information processing unit comprises:
   an attenuator having an input connected to one of the outputs of said sweep voltage former and an output connected to the input of said sweep signal converter;
   a pulse counter having a plurality of inputs and a plurality of outputs, one of said inputs being connected to one of the outputs of said driving generator and another of said inputs being connected to one of the outputs of the transceiver;
   a digital-to-analog converter having a plurality of inputs and an output, a part of the inputs thereof being connected to respective outputs of said pulse counter, and the output being connected to the second input of said sweep signal converter;
   said hydrometeorological information processing unit comprising a threshold member having an input connected to an input of said readout signal switching member and an output connected to one of the inputs of said indicator.

6. An apparatus for detecting heterogeneity of water surface, comprising:
   a transceiver generating sounding radar pulses, receiving a radar signal reflected from the water surface and forming a video signal carrying information on heterogeneity of the water surface;
   a hydrometeorological information processing unit connected to said transceiver and comprising:
      an amplitude selector connected to the output of said transceiver and selecting a part of the video signal within the amplitude range ensuring maximum contrast of heterogeneities against the background of the water surface;
      a video signal amplifier having an input connected to an output of said amplitude selector;

a video signal switching member having an input connected to an output of said video signal amplifier;

a cathode ray storage device having a plurality of inputs and one data output connected to an output of said video signal switching member;

a mode selector unit of the cathode ray storage device connected to said cathode ray storage device;

a readout signal switching member controlling a signal read out from said cathode ray storage device and having an input connected to said data output of the cathode ray storage device;

a driving generator having one of outputs thereof connected to an input of said transceiver;

a control unit having one input thereof connected to a second output of said transceiver, a second input connected to one of the outputs of said driving generator, one output connected to a second input of said readout signal switching member, a second output connected to said video signal switching member, and a third output connected to said mode selector unit of the cathode ray storage device;

an electron beam control system having:

a sweep voltage former having one input connected to a second output of said driving generator and another input thereof connected to one of the outputs of said transceiver;

a sweep signal converter having an input connected to an output of said sweep voltage former;

and a focusing and deflection system having an input connected to an output of said sweep signal converter and an output connected to said cathode ray storage device;

an auxiliary focusing and deflection system having an input connected to an output of said sweep signal converter and to an input of said main focusing and deflection system;

an auxiliary cathode ray storage device connected to said auxiliary focusing and deflection system;

an auxiliary mode selector unit of the auxiliary cathode ray storage device having a plurality of inputs and a plurality of outputs, said mode selector unit being connected to said auxiliary cathode ray storage device;

a variable reference voltage source having an output connected to one of the inputs of said auxiliary mode selector unit;

an auxiliary readout signal switch having a plurality of inputs and a plurality of outputs, one of said inputs being connected to an output of said auxiliary cathode ray storage device and one of said outputs being connected to a second input of said video signal amplifier;

a readout signal chopper having one input connected to a second output of said auxiliary readout signal switching member and a second input connected to one of the outputs of said control unit;

a readout signal amplifier having one input connected to an output of said readout signal chopper and another input connected to an output of said readout signal switching member;

an auxiliary control unit having a plurality of inputs and a plurality of outputs, one of said inputs being connected to one of the outputs of said transceiver, a second input being connected to one of the outputs of the driving generator, a third input being connected to one of the outputs of said control unit, one output being connected to a second input of said auxiliary mode selector unit and a second output being connected to one of the inputs of said auxiliary readout signal switching member;

an indicator having a plurality of inputs and an output, one input being connected to the output of said sweep voltage former, a second input being connected to one of the outputs of said control unit, and a third input being connected to an output of said readout signal amplifier.

7. An apparatus according to claim 6, comprising an auxiliary switching member having one input connected to one of the outputs of said control unit, another input connected to said variable reference voltage source and an output connected to an input of said auxiliary cathode ray storage device.

8. An apparatus according to claim 7, wherein a signal of said switching member is connected to said data output of the auxiliary cathode ray storage device.

9. An apparatus according to claim 4, wherein said hydrometeorological information processing unit also comprises:

a current sensor having an input connected to an input of said main cathode ray storage device;

an auxiliary attenuator having one input connected to an output of said current sensor, another input connected to one of the outputs of said main control unit and an output connected to one of the inputs of said video signal amplifier having its output which is connected to one of the inputs of said cathode ray storage device;

a current setting signal former having a plurality of inputs and an output, a first one and a second one of said inputs being connected to the outputs of said transceiver, a third one and a fourth one of said inputs being connected to the outputs of said driving generator, a fifth input being connected to the output of said main control unit and an output being connected to one of the inputs of said attenuator, the third input of said switch being connected to one of the outputs of said main control units.

* * * * *